Patented July 29, 1947

2,424,954

UNITED STATES PATENT OFFICE 2,424,954

METHOD OF PREPARING HECTOGRAPHIC INK

Douglas A. Newman, Port Washington, N. Y., assignor to Columbia Ribbon and Carbon Manufacturing Company, Inc., Glen Cove, N. Y., a corporation of New York No Drawing. Application August 11, 1943, Serial No. 498,256

7 Claims. (Cl. 106—22)

The invention relates to the art of duplication by the hectograph process and more particularly to an improvement in the method of preparing hectograph ink and the improved product resulting therefrom.

It is the object of the invention to produce a dye ink of desired color which will enable many copies to be made from the master sheet with substantially no change in tint of the copies between the beginning and end of the "run."

It is also an object of the invention to produce substantially black copies from combinations of colored dyes without substantial change in the color and hue of the ink on the copies as the printing progresses.

It is generally known to those engaged in the art that hectograph inks are compounded of suitable soluble dyes and a matrix, menstruum or vehicle in which the dyes are ground or milled to a very finely divided state. The dyes used are commonly water soluble and the menstruum or vehicle in which they are ground is usually a mixture of waxes or wax-like substances with modifying additions such as plasticizers or hardeners to give the proper or optimum physical characteristics.

When inks of bright colors, such as red or blue or green, are desired their fabrication presents little difficulty. A suitable dye of the desired color is chosen and is ground or milled to a substantially impalpable powder with a suitable vehicle in an ink mill of either the pot type or the roll type at the discretion of the ink maker. Such an ink functions satisfactorily when used as a hectograph ink to prepare a master copy for use with either the gelatin pad or the spirit method of duplication.

It is when an ink is desired of a color which is best produced by using a combination or mixture of two or more dyes that the advantages of the invention are fully realized.

In many cases such mixtures of dyes do not yield a constant hue or color as printing progresses. This applies particularly to black inks. There are no water soluble black dyes which have been found satisfactory for use in making master copies for either the gelatin pad or the spirit method of duplication. Therefore, when black ink is wanted it is universally customary to simulate black by mixing dyes of several colors to produce a very dark color, which, while not black, so nearly approaches black as to be acceptable and which is commonly called black in the trade. Such a combination of colored dyes which produces a very dark color is described in U. S. Patents Nos. 2,155,861 and 2,155,862 to Hughes. Other soluble dyes and other combinations of colors will produce ink which is substantially black when ground together in a vehicle.

If such an ink is to be applied to a backing membrane such as paper to produce hectograph carbon paper or paper typewriter ribbon the mixture of dyes may be ground in a vehicle consisting largely of waxy materials to give a non-smudging coating. Or, if the ink is to be applied to a fabric ribbon to be used in a writing machine, the vehicle may be composed largely of oil to give a more fluid consistency. Or, if the ink is to be used on a printing press the vehicle in which the dyes are ground may be a mixture of oils and waxes to give a consistency or body adapting it to use as a printing ink.

In each and all of these cases the several dyes, each of a crystalline nature, each with its own solubility index, and with its own degree of hardness and brittleness and ease or difficulty of grinding, are simultaneously ground in the appropriate vehicle. Regardless of the thoroughness of the grinding or milling operation or the minuteness of the resulting particles they are still of finite and measurable size and each individual particle is separate and distinct from each other particle, as may be observed by microscopic examination and demonstrated by simple tests. Also, the softest dye will be ground the finest and the hardest, toughest crystals will be ground the coarsest.

When such an ink is used with either the gelatin pad or the spirit method, but particularly with the spirit method, there occurs a selective or a differential solution of the various dyes according to their relative solubility index in the spirit fluid used. The more soluble dye or dyes are dissolved first leaving the less soluble dyes to be dissolved later. The result is that while the first copies taken from the master sheet may have a satisfactory near-black color there will take place a gradual change of color as successive copies are made until a distinct color, quite removed from black, results.

This tendency for the more soluble dye in the ink to be taken up by the spirit moistened copy sheet is particularly present and more noticeable when the copy sheets are given a relatively light coating of spirit or solvent fluid. If a heavier coating of solvent fluid is resorted to in order to dissolve more of the less soluble dyes in the ink the result is a more rapid depletion of the ink and a consequent reduction of the number of satisfactory copies obtainable.

This gradual change in the color of the image on copies made from hectograph master sheets using so called "black" ink of the mixed dye type is generally regarded as an inherent characteristic and shortcoming of the process which must be accepted and endured.

The invention substantially eliminates this defect of black inks of the mixed dye type by providing an ink which may be composed of substantially the same ingredients, both as to the dyes used and the vehicle in which they are ground, but in which the dye crystals are so intimately associated with each other that they may be considered as single complex crystals each containing some of each of the component dyes, both in appearance and in their action in the presence of the spirit solvent. In this condition the dyes dissolve collectively, instead of separately and selectively, in the spirit solvent and the black color of the copies is retained substantially without change throughout the run or until the ink of the master copy is substantially exhausted.

A similar effect may also be found when colored inks, composed of two or more dyes, are used. By the practice of the present invention a substantially constant color of the copies is maintained throughout the run.

I accomplish this intimate mixture of the component dye crystals by first dissolving properly proportioned quantities of the several dyes in a common solvent of all the dyes in the mixture, such as water or a mixture of water and alcohol. When all of the dye crystals are dissolved in the solvent I cause the several dyes to rapidly and simultaneously precipitate as crystals of mixed dyes without visible separate crystalline particles.

This precipitation I accomplish either by rapid evaporation of the solvent while subjected to agitation, either at atmospheric pressure or under a partial vacuum, or I may precipitate the dyes in crystalline form by chemical action such as the addition of a salt while the solution is rapidly agitated. I prefer the precipitation method to the evaporation method. I find sodium chloride to be a satisfactory precipitating agent. I add the sodium chloride in the form of a solution while the dye mixture is agitated. The result is a rapid and simultaneous precipitation of the several dyes in microscopically minute crystals which flocculate and attach themselves to other microscopic crystals of the other dyes to form complex and composite crystals of macroscopic size. I then filter and wash the crystals with a dilute solution of salt, and dry ready for use.

For example, I may prepare a mixture of dyes according to the following formula:

| | Per cent |
|---|---|
| Chrysoidine | 35 |
| Brilliant or ethyl green | 30 |
| Crystal violet | 25 |
| Rhodamine 6G | 10 |

I dissolve this mixture in water or in a mixture composed of ⅔ water and ⅓ alcohol to make a substantially 3% solution, that is, I dissolve 3 pounds of the above mixture in 97 pounds of water or of the water-alcohol mixture. I next prepare a saturated water solution containing 10 pounds of sodium chloride and I add this solution with rapid agitation to 100 pounds of the dye solution. I then filter the precipitated crystals of dye and wash with dilute salt solution and dry.

This composite dye I grind or mill in the conventional manner with the conventional vehicles to produce hectograph ink possessing the virtues and advantages hereinabove described.

Having described the invention and the manner of the fabrication and use so that one skilled in the art may make and use the same I now state what I believe to be new and novel and for which I pray that Letters Patent be granted.

I claim:

1. The method of preparing a hectographic ink, the coloring matter of which is composed of a plurality of water-soluble dyes of different colors, which comprises simultaneously and rapidly precipitating the dyes from a solution thereof in an aqueous solvent, while agitating the solution, to produce a residue of complex crystals wherein the several component dyes are present only in micro-crystalline form, and incorporating the complex dye crystals in a vehicle of the class consisting of oils and waxes.

2. The method of preparing a hectographic ink, the coloring matter of which is composed of a plurality of water-soluble dyes of different colors which comprises rapidly and simultaneously precipitating the dyes by evaporating a solution thereof in an aqueous solvent while agitating the solution, to produce a residue of complex crystals wherein the several component dyes are present only in micro-crystalline form, and incorporating the complex dye crystals in a vehicle of the class consisting of oil and waxes.

3. The method of preparing a hectographic ink, the coloring matter of which is composed of a plurality of water-soluble dyes of different colors, which comprises simultaneously and rapidly salting out said dyes from a solution thereof in an aqueous solvent while rapidly agitating the solution, to produce a residue of complex crystals, wherein the several component dyes are present only in micro-crystalline form, and incorporating the complex dye crystals in a vehicle of the class consisting of oils and waxes.

4. The method of preparing a hectographic ink, the coloring matter of which is composed of a plurality of water-soluble dyes of different colors, which comprises rapidly adding sodium chloride to a solution of said dyes in an aqueous solvent while rapidly agitating the mixture, to salt out the dyes in the form of complex crystals, wherein the several component dyes are present only in micro-crystalline form, and incorporating the complex dye crystals in a vehicle of the class consisting of oils and waxes.

5. The method of preparing a hectographic ink, the coloring matter of which is composed of a plurality of water-soluble dyes of different colors and having different solubility indexes, which comprises rapidly and simultaneously precipitating the dyes from a solution thereof in an aqueous solvent in the form of complex crystals, each containing some of each of the component dyes in micro-crystalline form; grinding the crystals; and incorporating the ground crystals in an undissolved state in a vehicle of the class consisting of oils and waxes, so that the component dyes of the complex crystals may be collectively and gradually dissolved for printing uniformly a color determined by the component dyes when the crystals are moistened with spirit solvent in the making of duplicate copies.

6. A hectographic transfer medium including a carrier having a transferable copying ink thereon comprising a vehicle of the class consisting of oils and waxes, containing undissolved ground complex crystals, each having therein component dyes of different colors and different solubility indexes in micro-crystalline form, whereby when transferred to a hectographic master sheet the component dyes are collectively and gradually dissolved for printing uniformly a color determined by the component dyes when moistened with spirit solvent in the making of duplicate copies.

7. A transferable hectographic copying ink comprising a vehicle of the class consisting of oils and waxes; containing undissolved and ground complex crystals each including component dyestuffs in micro-crystalline form, and initially of differet color producing characteristics whereby when transferred to a hectographic master sheet the dyestuffs are collectively and gradually dissolved for printing uniformly a color determined by the component dyestuffs when moistened with spirit solvent in the making of duplicate copies.

DOUGLAS A. NEWMAN.

REFERENCES CITED

The following references are of record in the file of this patent:

UNITED STATES PATENTS

| Number | Name | Date |
|---|---|---|
| 2,155,862 | Hughes (1) | Apr. 25, 1939 |
| 2,155,861 | Hughes (2) | Apr. 25, 1939 |
| 2,071,492 | Boehmer | Feb. 23, 1937 |
| 1,209,423 | Fisher | Dec. 19, 1916 |
| 506,663 | Bloede | Oct. 17, 1893 |